Dec. 1, 1953      L. H. BOWES      2,661,201
CHECK WEIGHER

Filed June 10, 1950      3 Sheets-Sheet 1

INVENTOR.
Leslie H. Bowes
BY Brown, Jackson,
Boettcher & Dienner
Atty's.

Dec. 1, 1953  L. H. BOWES  2,661,201
CHECK WEIGHER

Filed June 10, 1950  3 Sheets-Sheet 2

110 V 60 ~ A.C. SOURCE

INVENTOR.
Leslie H. Bowes
BY
Attys.

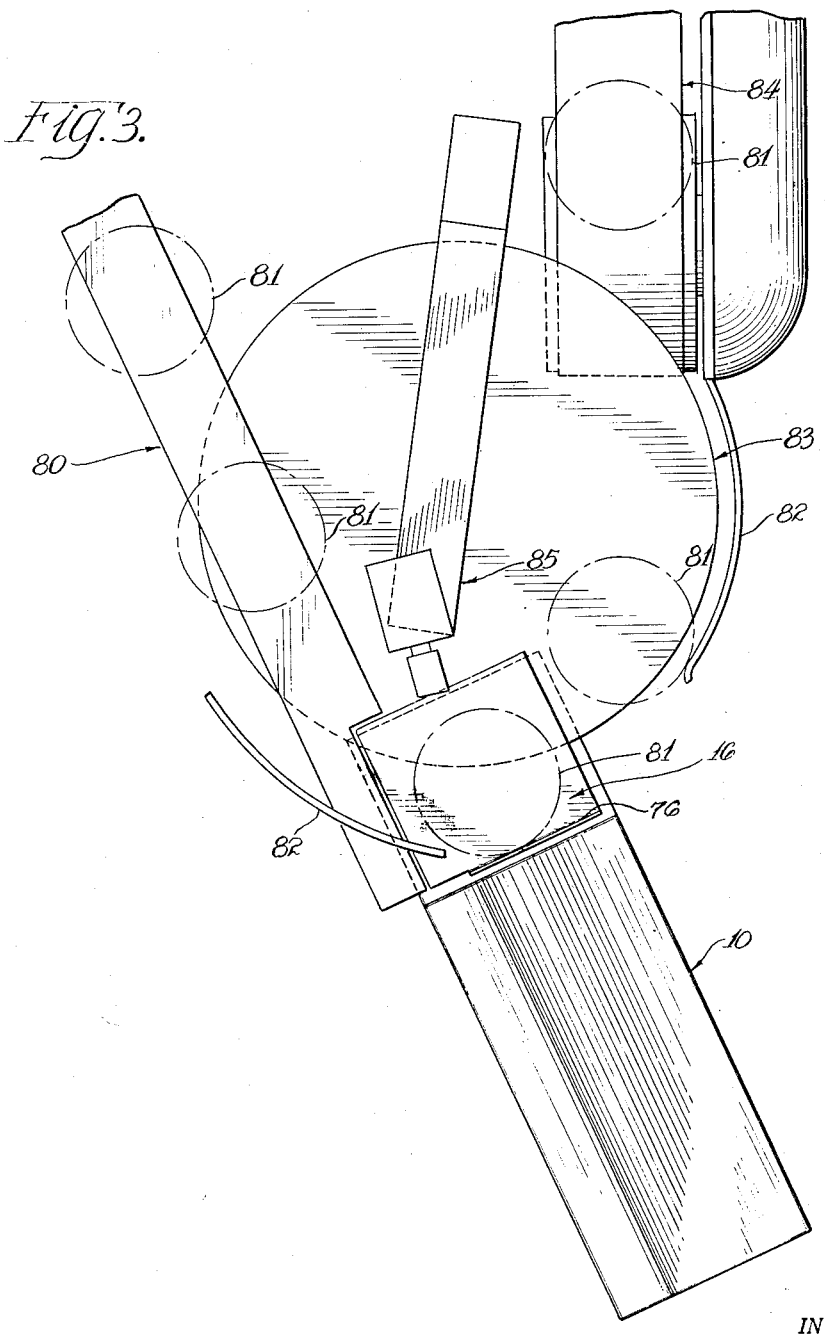

Patented Dec. 1, 1953

2,661,201

UNITED STATES PATENT OFFICE 2,661,201

CHECK WEIGHER

Leslie H. Bowes, Rittman, Ohio, assignor to Morton Salt Company, Rittman, Ohio, a corporation of Illinois Application June 10, 1950, Serial No. 167,464

2 Claims. (Cl. 265—43)

My present invention is mainly concerned with a new and improved weighing apparatus of the type normally utilized for checking the weight of packaged products, particularly canned goods or the like, to thereby readily determine if the package has been filled with the proper amount of the product.

Mor particularly my invention is directed to certain improvements over commercially available weighers whereby a rapid and more accurate check may be made of the weight of a packaged article, such as salt or similar items which are normally packaged in cans or like containers for sale to the public.

It is an important economic factor to producers and packagers of packaged goods, particularly food stuffs or similar bulk items which are packaged for sale to the public, to offer a packaged product which contains a standard amount of their particular item of merchandise. An easy and convenient method of determining uniformity of a packaged product is by checking the weight of the packaged item. With a standard container of a known weight it is very easy to determine if the container has been filled properly by checking its weight after the container has been filled. A typical example of one such standard and homogeneous item is common table salt. Since the salt producer sells his salt to the public in standard size boxes or containers, it is possible for him to lose the cost of tons of salt a year if he overfills his containers beyond the standard amount at which his selling price is determined. Conversely, underfilling of the boxes would be a violation of the seller's good faith to the purchaser.

In packaging an item such as salt, the cartons or cans are usually filled at a dispensing station as they move along a conveyor line. A check weigher is normally stationed in the conveying line beyond the filling station to check the filled boxes before they are loaded for shipping. The check weigher can be designed to discover both over-weight and under-weight packages, but particularly the latter as the manufacturer's good reputation and compliance with governmental packaging standards must be reckoned with. Off weight cans are rejected after the check weighing and these cans later reprocessed and their contents salvaged. The need for a weighing device in which the weighing beam is not continuously oscillating is readily apparent, as positive and accurate weighing must be made of every package and at the same time the weighing time must be in keeping with the speed of the delivery conveyor system. Additionally, the continuous oscillating of a weighing scale, due to the shifting of cans off and on the weighing platform, causes a rapid wearing out of the scale tending to destroy its accuracy. Accordingly, I have invented a check weigher to meet the requirements of rapid and accurate check weighing and in which the weighing platform is maintained steady during the loading and unloading thereof.

Briefly, my check weigher utilizes a mercury or like liquid hydrometer, utilizing the Archimedes principle of buoyancy, to dampen the oscillation of the weighing beam and counterweight the object to be weighed along with certain electrical circuits which have been arranged to energize an electromagnet to hold the weighing beam during the loading and unloading of the weighing pan so that the scale beam is always steady when the check weigher is being loaded and unloaded. Additionally, my check weigher is adapted to energize a remote rejector which rejects "off-weight" packages in response to a predetermined movement of the weighing scale beam.

It is an important object of my invention to disclose a check weighing device in which the weighing scale beam is automatically arrested by the use of an electromagnet during the periods of loading and unloading of the weighing platform.

It is a further object of my invention to disclose a check weigher in which a weighing scale beam is designed to be counter-balanced without the use of conventional counter weights.

It is another object of my invention to employ a buoyancy principle to regulate or counteract the depression of the weighing scale beam, provide the tare for the scale and effectively counterweight the object being weighed.

It is still another object of my invention to disclose an automatic check weigher which is electrically controlled and capable of rapid, accurate, and efficient check weighing of packaged articles, or the like, that are being continuously and rapidly delivered thereto.

These and further objects and features of my invention will be readily more apparent as the following specifications and description proceed. Now in order to acquaint those familiar with this art as to the mode of utilizing and constructing a check weighing device embodying the teachings of my invention, reference is made to the accompanying drawings wherein:

Figure 3 is a diagrammatic plan view of my check weigher in a typical conveyor line system, showing the operational relation therewith of an automatic rejector for removing off-weight packages.

Figure 1:
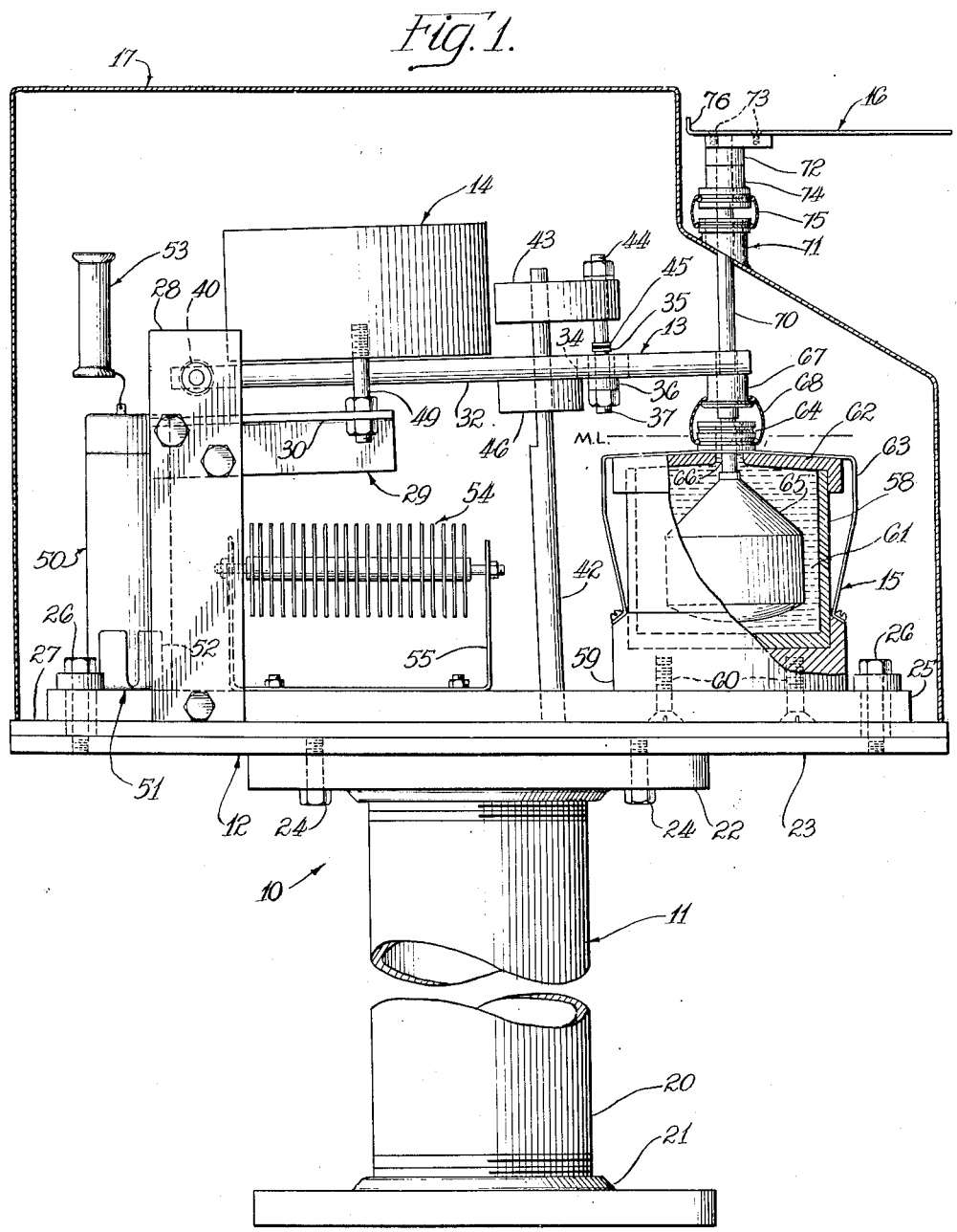
Figure 1 is a front elevational view of check weigher embodying the principles of my invention.

Looking now at Figures 1 and 2 of the drawings, it will be observed that my check weigher 10, therein illustrated, includes generally a supporting stand 11, a supporting framework 12, a scale beam 13, an electromagnetic beam arrestor 14, a hydrometer type of counterbalance 15, a weighing pan 16, and an outer cover 17, all operatively associated in a manner hereinafter to be described.

The supporting stand 11 comprises essentially, in the particular form herein illustrated, a central cylindrical pedestal member 20 having a lower flange footing member 21, mounted at its lower end in a suitable supporting manner, and an upper flange 22 mounted at its upper end for supporting the framework 12 of my check weigher.

The framework 12 includes a rectangular base plate 23 which is suitably secured to the upper flange member 22 by means of stud bolts 24. A scale base 25 is mounted to the base plate 23 by bolt members 26, or the like, being separated from the base plate by an intervening rubber gasket 27, as shown in Figure 1, to protect the weigher from floor vibrations or the like. A pair of vertically positioned lever arm, scale-beam, support members 28 are mounted upright near one end of the scale base 25 and fastened thereto by suitable means such as welding or the like. It will be noted that the scale beam supports 28 are mounted in spaced parallel relation one on either side of the scale base 25 for the pivotal mounting of one end of the scale beam therebetween. A pair of supporting bracket arms 29 are mounted, one to each of the scale arm support members 28, near their upper ends in a transverse relation therewith and are shown herein as comprising conventional angle irons having an outwardly turned upper flange 30.

Figure 2:
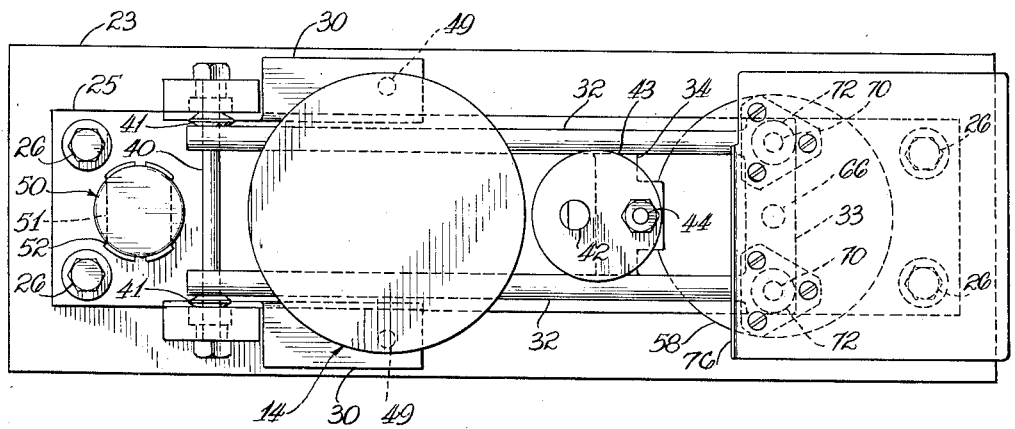
Figure 2 is a top plan view of the device shown in Figure 1.

The scale beam 13 is herein shown as comprising a pair of cylindrical rod arm members 32 of magnetic material, such as steel, rigidly secured in spaced parallel relation by a rectangular cross connecting bar 33 welded between the two arm members at their extreme right hand end as viewed in Figures 1 and 2. An additional intermediate cross connecting bar 34 is mounted between the two arms 32, leftwardly spaced from the end connecting bar 33 a suitable distance. A lower electrical contact member 35 is mounted centrally on top of the intermediate bar 34 and insulated therefrom by a cylindrical insulator member 36 which surrounds a contact connector bolt 37. The left hand end of the two arm members 32 of the scale beam are adapted to be pivotally mounted on a pivot shaft 40 rigidly mounted in a horizontal position between the upper ends of the two vertical beam arm support members 28, as is shown clearly in Figure 2. Suitable spacers 41 may be utilized between each of the arms 32 and their adjacent support members to keep the scale beam disposed centrally between the support members 28.

It should be noted that the scale beam is adapted to be substantially horizontal when in its fully depressed position and is angularly disposed with the horizontal when in its normal arrested position, as shown in Figure 1. Such an arrangement allows the scale beam to move with a free motion and prevents binding thereof with the pivot shaft 40.

An upright contactor post 42 is mounted to the scale base 25 so as to project vertically upward between the two spaced scale beam arm members 32 for supporting a contact holder 43 securely mounted to the post's upper end. A contact stud member 44 is inserted through the circular contact holder 43 near its right hand edge and is adapted to have an upper electrical contact 45 fastened to its lower end in registering spaced relation with the lower contact member 35. The stud member 44 is adapted to be threaded in the holder member 43 to adjust the gap between the two contacts 35 and 45 for adapting the weigher to cans of various standard minimum weights. A lower insulator block 46 is mounted to the contactor post directly below the scale beam so that the beam is positioned between the lower insulator 46 and the contact holder 43 when assembled and mounted to the scale arm support members 28. The arrangement of the two contact members, one associated with the beam and the other held rigidly above the beam, furnishes a convenient switch structure for opening and closing a suitable electric circuit in response to movement of the scale beam as will hereinafter be explained in connection with the schematic electrical circuit shown in Figure 4.

Figure 4:
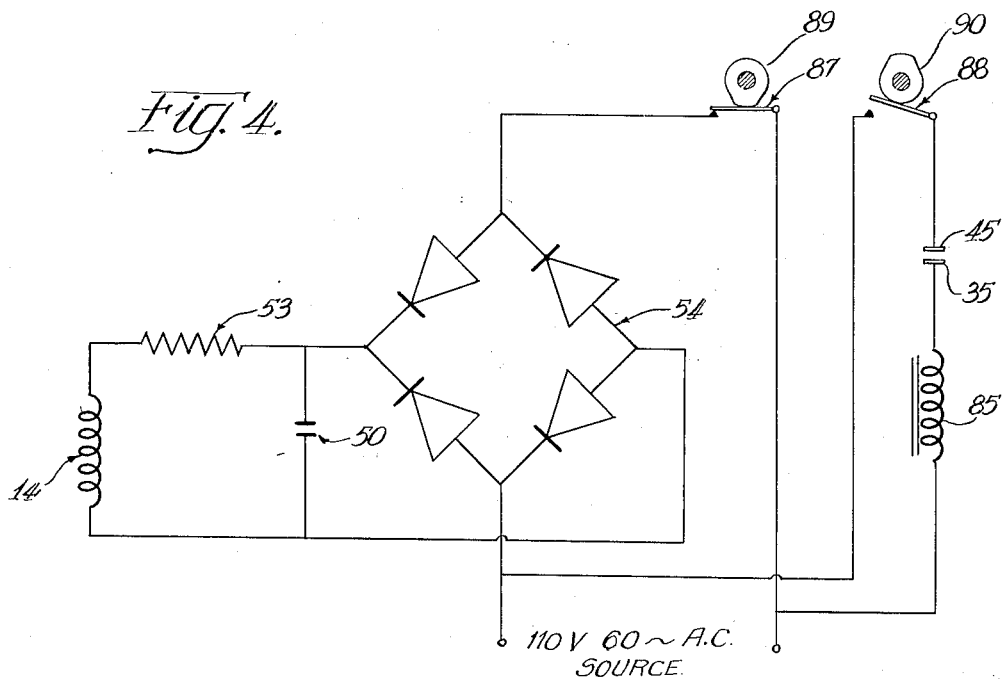
Figure 4 is a schematic wiring diagram of the electric circuits employed in my check weigher.

The electromagnetic beam arrestor 14 is shown in Figure 1 in its mounted position above the parallel beam arm members 32 so as to lie in approximate contact therewith. It should be noted that the electromagnet never contacts the scale beam, but is always separated therefrom by a suitable air gap. In this connection the two contacts 35 and 45 act as stops to arrest the upward swinging movement of the scale beam so that when they are in circuit closing contact, the electromagnet is still gapped from the beam 13 substantially as shown in Figure 1. Two stud bolts 49 are utilized to mount the electromagnet to the pair of support brackets 29; the lower ends of the stud bolts being securely bolted to the flange members 30 thereof. A rectifier capacitor 50, herein shown as 150 volt D. C. type, is mounted to the scale base member 25 in a vertical upright position, being held thereto by a capacitor bracket holder 51 having a plurality of resilient holding fingers 52. A 100 ohm, 20 watt resistor 53 is associated with the rectifier capacitor 50 and is also connected in circuit with the electromagnet as is shown schematically in Figure 4. Likewise, a selenium rectifier 54, herein shown as a 600 milliampere, 115 volt, A. C.-type, is also used in circuit with the electromagnet, being mounted on the scale base 25 by means of a rectifier holder 55. Of course, it will be understood that the particular capacity of the various items of the electrical circuit displayed herein may be varied depending on the size of electromagnet being utilized and also on the type of main line supply energy available. The particular electrical circuit herein displayed in Figure 4 is adapted for use with 110 volt, A. C., 60 cycle line supply; the rectifier 54 of course converting the A. C. into D. C. for use with the electromagnet which is connected in series therewith. The resistor 53 is also connected in series with the electromagnet and is positioned in the circuit between the magnet and the rectifier with the capacitor 50 connected in parallel circuit with the magnet, between the rectifier and the resistor. If desired the voltage across the two contacts 35 and 45 may be reduced to a matter of a few microvolts to prevent arcing and burning of the contacts. It would then be necessary to amplify the power with an electron amplifier tube, or the like, to cause proper operation of the solenoid kick-off. It is also feasible to allow the magnet to raise a weight off of the beam instead of acting directly on the beam as I have herein illustrated. If such a system were used, then a hanging weight would arrest the beam and the magnet would be used to pick up the weight to permit free movement of the scale beam.

Looking at Figure 1, it will be seen that the right hand end of the scale beam overhangs the counterbalance 15 which is based on a hydrometer buoyancy principle and utilizes a mercury cup or container 58 mounted on a base member 59 which is suitably fastened to the scale base 25 by screw members 60, 60. The container 58 is herein cylindrical in shape having a hollowed out interior for the reception therein of a body of mercury 61 which fills the container 58. A container cover 62 is adapted to cover over the top of the container and is tightly held thereto by means of a container cover clamp 63 rigidly secured to the container base and adapted to fit over the top of the container cover which is distinguished by a central, upwardly extending, hollow boss member 64.

A hollow air tight float 65 is adapted to be mounted within the interior of the container 58 to float submerged in the mercury 61 and is rigidly connected to the cross bar member 33 of the scale beam by means of a short float shaft 66 which extends through the hollowed out interior of the container cover's boss member 64. A mounting collar 67 is rigidly connected to the bottom of the cross bar 33 for the holding therein of the float shaft. A latex rubber sleeve 68 may be used for a dust and air seal and is resiliently fastened around both the mounting collar 67 and the cylindrical boss 64 for extensible unfolding movement in response to pivotal actuation of the scale beam about its mounting shaft 40. By the use of such a hydrometer style of counterbalance 15, it readily will be seen that the downward movement of the scale beam is resisted by the upper buoyant force exerted on the float by the body of mercury within the container, which buoyant force acts much as would a counterweight suspended on the scale beam to the left of the pivot mounting shaft 40; a system conventionally used in most weighing scales.

In this connection it should be understood that the float 65 acts as the tare of the scale, being always submerged in the mercury which reaches to the level designated "ML" in Figure 1. The float is of sufficient volume coupled with the volume of the submerged portion of shaft 66, as shown in Figure 1, to establish an upward buoyant force, when so submerged, equal to the downwardly exerted effective weight of the scale beam 13, pan 16 and the interconnecting linkages plus the weight of a standard weight, filled container of the type to be check weighed, such as a standard 26 ounce box of salt or the like. Variation of the buoyant tare force of the float counterweight for adapting the check weigher to various standard weights conveniently may be accomplished by carying the diameter or length of shaft 66. Of course the float size could be changed as well, but it is preferred that the variance of the buoyant force take place by varying the dimensions of shaft 66. It will be readily apparent that upon a depression of the scale beam the shaft 66 causes an increase in the mercury displacement to result in an eventual balance between the downwardly exerted weight and the upwardly exerted buoyant forces. Also by having the tare include the weight of a standard filled container the scale beam will be depressed only by cans which are overweight in comparison to the standard. This means that a lightweight can will be discovered immediately without downward movement of the scale beam, which is time consuming. The shaft 66 of course also acts as a variable buoyant counterweight to balance overweight cans since an increase in its submerged portion causes a corresponding increase in the buoyancy effect. It will also be recognized that by having only the shaft 66 break through the surface of the mercury 61, splashing and surface effect is reduced to a minimum, especially when that surface is confined to the smaller internal dimensions of the boss 64. Also the amount of mercury subject to oxidation, which produces detrimental surface scale effect, is likewise minimized; added precaution being taken in the latter feature by providing the air tight seal 68 as well.

A weighing pan 16 is connected to the right hand end of the scale beam by means of a pair of interconnecting support rod members 70 which are rigidly fastened to the cross bar member 33 at the right hand end of the scale beam and are adapted to extend upwardly through the outer cover 17 passing through suitable openings therein. A pair of bushing members 71 are fastened to the outer surface of the cover member 17, as by welding or the like, to act as seals and guides for the rods 70. The upper end of the pan support rods are adapted to be press fitted within supporting flange members 72 securely mounted to the bottom of the scale pan by screws 73. A spacing collar 74 may be mounted below the pan support flanges around each of the support rod members and thin latex rubber sleeves 75 mounted between the collars 74 and the bushings 71 to provide dust seals. It will be noted that both of the dust seals allow vertical actuation of the scale beam and in no way hinder its delicate operation and balance. The pan itself is provided with an upwardly extending edge portion 76 along one margin which serves as a stop against which the object being weighed is placed. It is essential to the balance of the scale that the cans, or the like, rest against this stop so that there is no increase in the effective moment arm from the single pivot axis of the scale beam to the center of gravity of the weighed item by which the effective tare is determined.

The outer cover 17 is herein shown as being a hollow metal shell of suitable shape to cover over the previously and above described apparatus and is adapted to rest its lower edges on the gasket member 27; its purpose being to keep the check weigher free of dust or the like. The top surface of the cover may be slanted to one side so that when a rejected can is kicked off of the weighing pan it will fall forwardly onto the top of the cover 17 and roll to one side down the inclined top portion thereof. Of course, if the rejector is remote from the weighing pan no such design of the cover would be needed.

Use and operation

Looking at Figure 3 of the drawings it will be observed that my check weigher 10 is adapted to be mounted for use with an incoming conveyor system 80 so that the weighing scale pan 16 is at the discharge end of the incoming conveyor which carries filled cans 81 toward the weighing pan 16. A suitable guide member 82 is utilized to guide the cans from the incoming conveyor 80 onto the weighing pan and off again. A rotating turntable 83 is mounted adjacent the weighing pan and is adapted to carry the weighed cans away from the weighing pan 16 to an outwardly going belt conveyor 84, or the like; the cans being pushed off of the pan 16 to the turntable 83 by the next incoming can delivered by the conveyor 80. Of course, it should be recognized that the schematic conveying set-up shown in Figure 3 is only one of many ways in which my check weigher may be utilized in a continuous moving production line. An ejector solenoid 85 may be utilized to eject cans from the weighing pan which do not meet the required weight. Although, as shown herein, the ejector is shown adjacent the weighing pan so that when a light can, for instance, is on the platform it immediately will be kicked off of the pan onto the top cover 17 of the weigher from whence it rolls to a bin or the like; it is perfectly possible and equally as desirable to have the ejector at a more remote station, say along the outgoing conveyor. When this alternate location is used the ejection is timed with the conveyor movement so that the proper can is rejected. Such a system is known to those familiar with the art of conveyors and continuous production lines. If the can on the platform meets the required weight the next can delivered by the incoming conveyor pushes the weighted can onto the turntable for delivery to the outgoing conveyor.

The incoming conveyor is provided with a set of cam operated switches 87 and 88 as shown in Figure 4; switch 87 being normally closed and switch 88 being normally open. The normally closed switch 87, as shown in Figure 4, is connected in circuit controlling relation with the electromagnetic beam arrestor 14 which holds the arm members 32 of the scale beam stationary under the influence of its magnetic field during the loading and unloading of the weighing pan 16. As a can reaches the weighing pan 16 the cam 89 associated with switch 87 is rotated sufficiently to allow opening of that switch which deenergizes the electromagnet 14 thereby allowing the scale beam to seek its own level against the buoyant force exerted by the mercury 61 on the float member 65 and shaft 66. If the can being checked is light, the weighing platform and scale beam do not descend to open the normally closed upper and lower contacts 45 and 35 respectively and immediate rejection of that can occurs. A cam 90 associated with the switches mounted on the incoming conveyor, closes the normally open switch 88 and if the contacts 35 and 45 are in a closed position, the ejector solenoid 85 is energized to kick the can off of the weighing pan into a reject pile or the like. If the contacts 35 and 45 are open due to the sufficient depression of the scale beam, of course, the checked can is not ejected from the scale pan, but is pushed onto the turntable 83 by the next incoming can from conveyor 81. Meanwhile the cam operated switch 87 will again be closed whereby the magnetic field of the arrestor 14 will grip the arms 32 of the scale beam to hold the scale pan rigid during the transfer of the cans on and off of the weighing pan. The solenoid rejector may also be set up with additional contacts below the scale beam to eject overweight cans in a like manner upon excessive depression of the scale beam.

The operational cycle in résumé is briefly as follows: The electromagnet normally holds the weighing platform in a rigid position while a transfer of the cans is made. The magnet then releases the scale beam so that the mercury float 65 and shaft 66 will be subject to the buoyant forces exerted by the mercury 61 and if the can is light the weighing contacts 35 and 45 remain closed. A fraction of a second after the magnet lets go of the scale beam the normally opened circuit for the ejector is closed by one of the cam operated switches associated with the incoming conveyor and if the weighing contacts 35 and 45 also remain closed with a can on the weighing pan the can is kicked off the pan by the ejector solenoid 85. Immediately thereafter the circuit of the ejector is again opened by the cam associated with the normally opened switch 88. Immediately the magnet is again energized to lock the platform and the shifting of the cans occurs for a repetition of the check weighing operation.

Thus it may be seen that I have provided a new and simplified type of check weigher utilizing an electromagnetic beam arrestor which makes it possible to have a rapid and accurate check weighing of canned articles, or the like, without causing undue wear of the delicate balance of the weighing scale. Additionally, the use of a mercury hydrometer style of counterweight dampens the oscillation effect of the scale beam, effectively supplies the tare for the weighing scale and counterweights the article being weighed, making for an improved type of weighing scale.

While I have herein shown and displayed a preferred form in which the teachings and principles of my invention may appear, it will be readily understood and perceived that numerous changes, modifications, and substitutions of equivalents may readily be made without departing from the spirit and scope hereof and, therefore, I do not wish to be limited to the specific embodiment herein illustrated except as may appear in the following appended claims.

I claim:

1. In a check weigher of the class described, the combination comprising, a liquid carrying container, a float submerged in said liquid and providing a buoyant tare and standard counterweight for articles to be check weighed, a single rod member, having a relatively small diameter in comparison to said float, attached coaxially to said float and extending outwardly of said container, said rod riding freely in said liquid at its exit from said container, a pan member secured to the upper end of said rod for receiving articles to be check weighed, and a cantilever beam pivotally movable about a single axis remote laterally of said rod and fixedly attached at one end to said rod to guide said rod, pan and float along a fixed path of movement relative to said container.

2. In a check weigher of the class described, the combination comprising, a liquid filled container having a single opening formed centrally in its upper end, a float member totally submerged in the liquid within said container, a single rod member, having a relatively small cross section in comparison to the cross section of said float, connected to the float and extending outwardly of said container via said opening therein; an article receiving pan means mounted to the upper end of said rod, a beam member connected at one end rigidly to said rod and extending transversely therefrom, and means supporting said beam member at its opposite end for pivotal movement about a single horizontal axis, said submerged float providing a buoyant tare and standard counter-balance force, said rod providing a counterbalance weight for articles on said pan variably dependent on the portion of said rod submerged in said liquid, and said beam guiding said rod, pan and float for movement substantially coaxially of said container's opening.

LESLIE H. BOWES.

References Cited in the file of this patent

UNITED STATES PATENTS

| Number | Name | Date |
|---|---|---|
| 570,299 | Richards | Oct. 27, 1896 |
| 1,013,479 | Elliott | Jan. 2, 1912 |
| 1,199,687 | Gephardt | Sept. 26, 1916 |
| 1,656,210 | Litchfield | Jan. 17, 1928 |
| 1,736,079 | Hollwood | Nov. 19, 1929 |
| 2,011,608 | Belknop | Aug. 20, 1935 |
| 2,058,775 | Cundall | Oct. 27, 1936 |
| 2,076,617 | Cleaves | Apr. 13, 1937 |
| 2,099,893 | Jones | Nov. 23, 1937 |
| 2,112,823 | Breuilh | Apr. 5, 1938 |
| 2,157,577 | Schroeder | May 9, 1939 |
| 2,307,695 | Manshendel | Jan. 5, 1943 |
| 2,310,988 | Nowak | Feb. 16, 1943 |
| 2,488,037 | Rupley | Nov. 15, 1949 |